United States Patent
Kosco

(10) Patent No.: US 6,477,165 B1
(45) Date of Patent: Nov. 5, 2002

(54) BROADCAST COMMAND PACKET PROTOCOL FOR SCSI INTERFACE

(75) Inventor: Michael T. Kosco, Newport Beach, CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/097,899

(22) Filed: Jun. 16, 1998

Related U.S. Application Data

(60) Provisional application No. 60/049,725, filed on Jun. 16, 1997.

(51) Int. Cl.⁷ .............................. H04Q 7/00; H04B 1/00; G06F 5/00
(52) U.S. Cl. .................. 370/389; 370/462; 710/36; 710/113
(58) Field of Search ................................ 370/389, 329, 370/253, 349, 328, 392, 471, 474, 390, 393, 397, 399, 414, 416, 418, 447, 409, 473, 475, 461, 462; 710/36, 39, 113, 119, 107, 128, 129

(56) References Cited

U.S. PATENT DOCUMENTS 5,613,076 A * 3/1997 Latif et al.
5,758,109 A * 5/1998 Gafford et al.

* cited by examiner

*Primary Examiner*—William Luther
(74) *Attorney, Agent, or Firm*—Martine & Penilla, LLP

(57) ABSTRACT

A broadcast command packet protocol provides for significant reduction of the overhead associated with a data transfer operation and the consequent increase in throughput efficiency. IDENTIFY and SIMPLE TAG messages, along with a command descriptor block, are collapsed into a 24-byte packet which is broadcast to all target devices residing on a bus in a "burst" subsequent to an arbitration and a NULL SELECT phase. Multiple broadcast command packets are sequentially burst onto the data bus in back-to-back fashion, to one or more target devices subsequent to a single arbitration phase. Each target device verifies its own ID, queues up its intended commands, and subsequently arbitrates for control of the bus to executed the commands.

15 Claims, 6 Drawing Sheets

| Byte | Description | | | | | | | |
|---|---|---|---|---|---|---|---|---|
| | 7 | 6 | 5 | 4 | 3 | 2 | 1 | 0 |
| 0 | 1 | Dis Prv | LUN TAR | Res | Res | LUNTRN | | |

...

| 0 | Message (20h, 21h, 22h) |
|---|---|
| 1 | I/O Process/Queue Tag Reference Number |

...

| | 7 | 6 | 5 | 4 | 3 | 2 | 1 | 0 |
|---|---|---|---|---|---|---|---|---|
| 0 | | | | | | | | |
| 1 | LUN | | | Reserved | | | | |
| 2 | Logical Block | | | | | | | |
| 3 | | | | | | | | |
| 4 | | | | | | | | |
| 5 | | | | | | | | |
| 6 | Reserved | | | | | | | |
| 7 | Transfer Length | | | | | | | |
| 8 | | | | | | | | |
| 9 | Control Byte | | | | | | | |

*FIG. 3*

| Byte | Description | | | | | | | | Length |
|---|---|---|---|---|---|---|---|---|---|
| | 7 | 6 | 5 | 4 | 3 | 2 | 1 | 0 | |
| 0 | CM | UT | Res | Target ID | | | | | 1 |
| 1 | Res | Res | Res | Initiator ID | | | | | 1 |
| 2 | Identify Message | | | | | | | | 1 |
| 3 | Queue Tag Message | | | | | | | | 1 |
| 4 | Queue Tag Value | | | | | | | | 1 |
| 5 | Reserved | | | | | | | | 1 |
| 6 | Command Length (=10) | | | | | | | | |
| 7 | OpCode | | | | | | | | |
| 8 | LUN | | | Reserved | | | | | |
| 9 | Logical Block | | | | | | | | 16 |
| 10 | | | | | | | | | |
| 11 | | | | | | | | | |
| 12 | | | | | | | | | |
| 13 | Reserved | | | | | | | | |
| 14 | Transfer Length | | | | | | | | |
| 15 | | | | | | | | | |
| 16 | Control Byte | | | | | | | | |
| 17-21 | Additional Payload if Required | | | | | | | | |
| 22 | LRC Checksum | | | | | | | | 2 |
| 23 | | | | | | | | | |

*FIG. 4*

BROADCAST COMMAND PACKET PROTOCOL FOR SCSI INTERFACE

This application claims benefit of provisional appln. Ser. No. 60/049,725 filed Jun. 16, 1997.

CROSS-REFERENCE TO RELATED APPLICATIONS

This application is related to co-pending application entitled Quick Arbitration and Select Protocol for SCSI Interface, filed on instant date herewith and owned by the Assignee of the present invention, the disclosure of which is expressly incorporated herein by reference.

FIELD OF THE INVENTION

The present invention is directed to high speed SCSI data transmission protocols and, more particularly, to a system and method for broadcasting a number of SCSI commands sequentially to a number of capable target devices, without requiring an intervening arbitration.

BACKGROUND OF THE INVENTION

The SCSI interface may be best described as a device independent input/output bus which allows a variety of peripheral devices to be connected to a personal computer system. SCSI refers to Small Computer Systems Interface and was initially developed to provide a disk drive interface that supported logical addressing of data rather than the more prevalent physical addressing. In addition, the SCSI interface was developed to transfer information in parallel, byte-wise fashion instead of serially, thus, ending certain compatibility difficulties associated with developing new disk drive technologies and bringing them to the market place. The electrical characteristics and signal protocols of the SCSI interface were developed in such a manner that the requirements of various peripheral devices could be accommodated with relative ease and flexibility. In particular, the SCSI interface protocol defines a number of commands which are available for accessing and querying a particular peripheral device regarding the parameter set required for the device to operate correctly. This particular feature of the SCSI interface makes it possible for a system designer to write a software device driver program for a generalized peripheral device, without regard to device specific parameter set details.

In accordance with the various versions of the SCSI interface, such as SCSI-1, SCSI-2, and SCSI-3, anywhere from 8 to 32 individual peripheral devices can be addressed on an SCSI bus depending on whether the bus is an 8-bit bus, a 16-bit bus or a 32-bit bus. These devices are generally categorized as initiators and targets, with any particular peripheral device able to play either role at any particular point in time. Specifically, a peripheral device functioning as an initiator is a device that initiates an information transaction or data transfer by giving another peripheral device a particular task to perform. An example of an initiator might well be the SCSI host adapter of a personal computer system, while an example of a typical target device might well be a rotating disk data storage system such as a hard disk drive or CD-ROM. A target peripheral device may thus be seen as the device which carries out the task identified by the initiator. As was mentioned previously, an SCSI interface bus configuration may have any combination of initiator and target devices, so long as the total does not exceed the number allowed by the bus width (8, 16, or 32).

However, regardless of the width of the SCSI bus, all data or information transfer transactions must take place in accord with the SCSI protocol, in which initiators must arbitrate for control of the SCSI bus before any message, command or data transaction is allowed to take place between an initiator and a target device. Conventionally, an arbitration winning initiator selects a particular target device to receive messages, commands and data in order to perform an information transfer transaction. If an initiator device requires several target devices to perform certain functions, that initiator must continue to re-arbitrate for control of the bus and sequentially address each of the target devices, in turn. For each target transaction, there is an arbitration, selection, a message phase, and a phase wherein the initiator transmits command and data information to the target, prior to the targets sending a message back to the initiator indicating receipt. This protocol activity takes place sequentially for each target device, with each transaction being completed, before the next is initiated.

Given the significant increases in SCSI information transmission speeds over the past few years, it will be understood that logically serial data communication transactions with several target devices involves a significant degree of overhead, particularly with regard to the several phase changes required in an conventional initiator/target transaction.

Accordingly, it will be seen that there is a need for some means to collapse the conventional SCSI transaction protocol so as to allow an initiator device to address a large number of target devices directly and to provide command information to each of the target devices in a single protocol sequence, without the need to affirmatively address each target device in turn and without the need to receive an affirmative acknowledgment from each target device.

SUMMARY OF THE INVENTION

The present invention provides for significant reductions in communication transaction overhead and the consequent increase in efficiency in average throughput in the context of typical operational data transfers, by bursting multiple broadcast command information packets in a single, novel protocol phase, termed the broadcast command packet phase.

In one aspect of the invention, target and initiator devices are coupled to an SCSI bus and are indicated as being broadcast command packet capable by entering suitable device configuration information into each device's mode parameter pages by inclusion of a packet capability code bit. The SCSI bus system coupling the target and initiator devices is placed into broadcast command packet mode by a Mode Select operation indicating the peripheral device parameter page. A device identifies itself as broadcast command capable by transmitting BCP capability information as extensions to the transfer width exponent code used in WIDE DATA TRANSFER negotiations. The broadcast command packet protocol is initiated following an arbitration phase. The SCSI initiator with the highest priority ID asserts SEL in response to winning arbitration. The arbitration winner enters the broadcast command packet protocol by asserting NULL SELECT, defined by assertion of SEL with a no value applied to the data signal lines. Upon detection of NULL SELECT, all target devices which are broadcast command packet capable enter the broadcast command packet phase. A 24-byte packet is burst from the initiator in accordance with 24 consecutive ACK pulses, each pulse comprising a packet byte. Each target device decodes the device ID header of the packet and, if it is the identified target, the target receives the broadcast command packet information and sends a single REQ pulse back to the initiator.

In another aspect of the invention, multiple command packets are burst to one or more target devices during the broadcast command packet phase. Multiple command packets are sequentially burst to the data bus subsequent to a single arbitration. Each broadcast command packet capable target device connected to the bus evaluates the bus contents and, when it identifies a command packet with its address, receives the packet, queues the command and sends a single REQ pulse back to the initiator. The target device identified in the first packet may immediately place the bus in the data phase by deasserting C/D and MSG at the end of the broadcast command packet phase and begin transferring data. Following data transfer, the bus protocol cycle concludes normally with status and complete message phases before releasing the bus to a bus free condition.

In a further aspect of the invention, a broadcast command packet is a 24-byte template which includes a target ID, a command or message bit (CM) and a tagged or untagged (UT) bit. The command or message (CM) bit indicates whether the content of the packet payload is a command descriptor block or comprises additional messages. The broadcast command packet further comprises the ID of the broadcast command initiator, and IDENTIFY message, a queue TAG message and a queue tag value. The packet further comprises a 16-bit packet payload which is flexibly defined to comprise an up to 16 byte command descriptor block or 16-bytes of additional messages.

Thus, it may be seen that a significant reduction in the overhead associated with a data transfer operation and a consequent increase in throughput efficiency can be achieved, in accordance with practice of the present invention, by collapsing the IDENTIFY and SIMPLE TAG messages along with the command descriptor block into a 24-byte broadcast command packet. Command packets are broadcast to all target devices residing on a bus in a "burst" subsequent to an arbitration and a novel select phase. Multiple broadcast command packets are sequentially burst onto the data bus in "back-to-back" fashion to one or more targets subsequent to a single arbitration phase. The SCSI ID of the particular target device selected to perform a particular command is embedded in an ID field contained within each packet.

BRIEF DESCRIPTION OF THE DRAWINGS

Features, aspects and advantages of the present invention will be more fully understood when considered with respect to the following detailed description, and accompanying drawings, wherein:

FIG. 3 is a template depicting the byte structure of an IDENTIFY message, a TAG message, and a command descriptor block;

FIG. 4 is a template depicting the byte structure of a broadcast command packet;

DETAILED DESCRIPTION OF THE INVENTION

Prior to describing the broadcast command packet protocol in accordance with the present invention, it will be necessary to develop some understanding of the operation of the SCSI bus, as it would exist operating at FAST-80 data rates within the SCSI-3 protocol domain. While not yet established as a specific SCSI standard, the SCSI protocol domain will be taken herein to be that set forth in the presently pending SCSI Parallel Interface (SPI) document X3T10/855D. In particular, transactions in accordance with the SCSI-3 protocol generally follow SCSI-2 practice and comprise several distinct bus phases, such as; bus free, arbitration, selection, reselection, command, data, message and status. As will be well understood by those having skill in the art the message phase may be further particularized into message in and message out phases, while the data phase will be recognized to refer to either data in or data out.

Of the bus phases referred to above, the arbitration phase, selection phase and reselection phase deal exclusively with the bus protocol. In accordance with convention, the arbitration phase defines that period during which one or more SCSI initiators (or SCSI targets wishing to reconnect to the bus) compete in order to determine which device will gain control of the SCSI bus.

Figure 1:
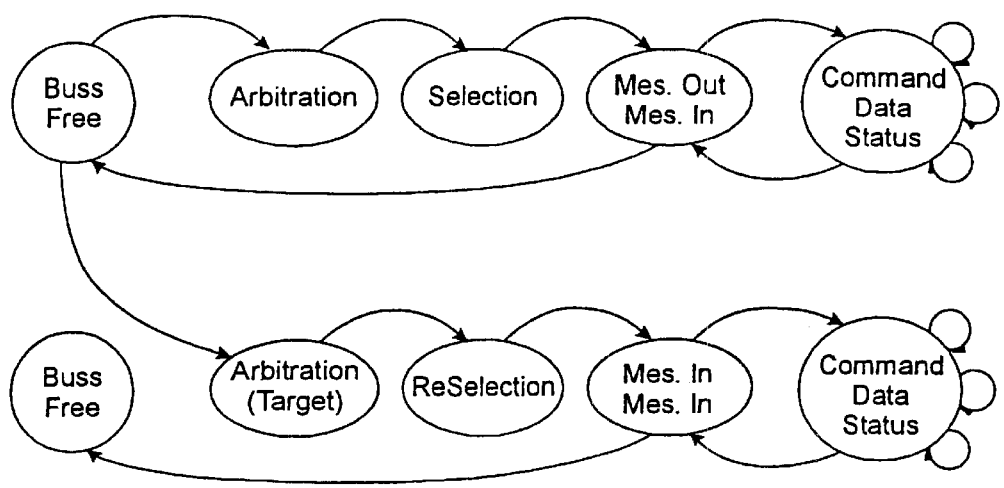
FIG. 1 is a simplified phase diagram of the conventional SCSI-3 protocol.
Figure 2:
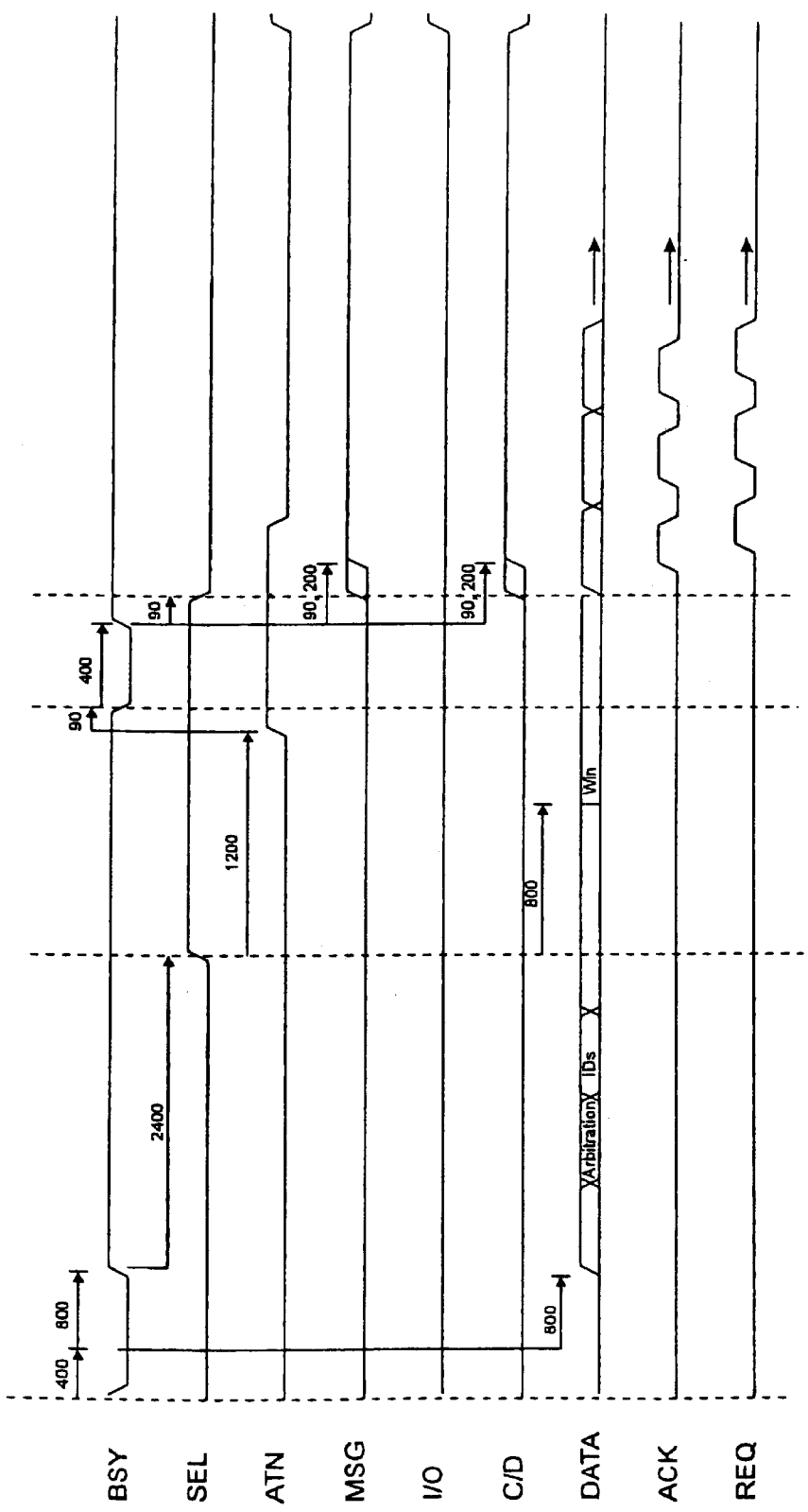
FIG. 2 is a simplified timing diagram of the conventional SCSI-3 protocol.

The conventional portion of the SCSI-3 protocol can be best understood with reference to FIGS. 1 and 2 which depict a simplified phase diagram and simplified timing diagram, respectively, of the conventional SCSI-3 protocol. Although several variations to the SCSI specification are in use, the timings and phase flows are given in accordance with the SCSI specification as defined by ANSI X3.131-1994 (the so-called SCSI-2 specification). According to this SCSI specification, if a particular initiator (or alternatively a target) wishes to arbitrate for use of the bus, the device asserts BSY, while at the same time asserting the data bit (DB0–DB7) that corresponds to its SCSI ID.

Each initiator, which is actively arbitrating for use of the bus, examines the data bus portion to determine whether a higher priority SCSI ID is being asserted in competition for use of the bus. In accordance with the SCSI protocol, the arbitration winner is defined as the device with the highest SCSI ID value (i.e., ID-07 has the highest priority, ID-00 has the lowest). If, for example, initiator ID-07 was arbitrating for the bus, it would win arbitration and assert SEL, thus indicating to all other competing devices that arbitration is concluded and they should release BSY and deassert their SCSI ID from the data bus portion.

Once a particular initiator (or a target device wishing to reconnect to the bus) wins arbitration, a selection phase is established (a reselection phase is established in the case of a target device winning arbitration), during which a connection is established between the initiator and the desired target device. The winning initiator asserts the data bus with the corresponding ID bit of the desired target, and asserts ATN, indicating that a message out phase will follow. Following an approximately 90 ns deskew delay, after ATN assertion, the initiator releases BSY.

At this point (BSY released), all of the devices coupled to the bus examine the data bus portion to determine whether their SCSI ID bit is asserted thereon. If a device identifies its SCSI ID bit on the data bus, it evaluates the data bus to determine the identity of the initiator (the second set data bit on the bus) and asserts BSY in order to take control of the SCSI bus.

No more than approximately 90 ns of deskew delay following the assertion of BSY by a target device, the initiator releases SEL and begins a message out bus phase. The message phase is commonly used by target devices to transfer message bytes containing information concerning the SCSI protocol. With regard to the polarity of the message phase, in and out are conventionally interpreted with respect to the initiator device (i.e., message out refers to a message being sent by the initiator to the target). While message formats may comprise a single byte, two bytes, or an extended message comprising a multiplicity of bytes, the messages described in accordance with the invention will be limited to IDENTIFY (80h-FFh) and SIMPLE QUEUE TAG (20h), for the sake of simplicity and convenience.

If a target is intended to receive a message from an initiator device, the initiator device asserts ATN, which requires the target device to transition the bus to message out phase where the message is transmitted according to the conventional REQ/ACK sequence. So long as ATN is asserted, the message transfer proceeds in accordance with the conventional SCSI REQ/ACK sequence. A target device asserts REQ in response to which the initiator transfers a message byte onto the data bus and asserts ACK. The target device reads the byte and releases REQ, following which the initiator releases ACK to complete the transfer. ATN is released by the initiator when all of the bytes comprising the message, or messages, have been transferred to the target which ends the message phase by releasing MSG.

Following transmission of the message bytes, the initiator releases ATN, and the target device enters the command phase in order to receive the SCSI command descriptor block (CDB) from the initiator. The command phase is characterized by the C/D line being asserted while I/O and MSG are deasserted (inactive).

SCSI commands are provided to the data bus by the initiator as a sequence of bytes, commonly referred to as a command descriptor block. As will be understood by those having skill in the art, descriptor blocks may be 6, 10, 12 or 16 bytes in length, and are sequentially read by the target device in accordance with the REQ/ACK sequence described above. In accordance with accepted convention, the first byte of every command descriptor block is termed the OP code and includes a command group which corresponds to a descriptor block of particular length. By examining the first byte of a command descriptor block, a target device is able to determine which command to execute and how many bytes remain in the descriptor block to be received. After the target receives and queues all the command bytes from the initiator, the target releases C/D, thus ending the command phase.

Following the command phase, a data phase controls information and user data exchange between the target device and the initiator. A target device begins a data phase by deasserting C/D and MSG, at which time asynchronous or synchronous data transfers may take place between the two devices. If data is desired to be transferred from the target to the initiator, the target asserts I/O, thereby indicating that the data phase is a data in phase (data to the initiator). Conversely, if data is desired to be transferred from the initiator to the target device, (i.e., the target wishes to receive data), the target deasserts I/O indicating that the data phase is a data out phase (data out of the initiator). Data bytes are transferred to or from the target device in accordance with the REQ/ACK sequences described in connection with the message and command phases above.

Finally, a target device enters the status phase in order to transmit a status byte (such as good, busy, intermediate, condition met and the like) to the initiator. The status byte is transferred in a single REQ/ACK sequence and is followed by a message in phase which informs the initiator that a particular command has finished executing. If no further commands or I/O processes are contained within the target device's command queue, the target device releases the bus which subsequently enters the bus-free condition.

A significant reduction in the overhead associated with a data transfer operation and a consequent increase in throughput efficiency can be achieved, in accordance with practice of the present invention, by collapsing the IDENTIFY and SIMPLE TAG messages along with the command descriptor block into a 24-byte packet termed, in accordance with the invention, a broadcast command packet. Broadcast command packets would be broadcast to all target devices residing on a bus in a "burst" (for example, at 80 MB/s), subsequent to an arbitration and a novel select phase to be described in greater detail below. In addition, multiple broadcast command packets are able to be sequentially burst onto the data bus in "back-to-back" fashion, to one or more targets subsequent to a single arbitration phase. As will be further developed below, the SCSI ID of the particular target device selected to perform a particular command, is embedded in an ID field contained within each packet.

Configuring a particular SCSI device to be capable of operation within the broadcast command packet protocol, in accordance with the invention may be accomplished in a variety of ways. One method may include entering suitable device configuration information into a particular SCSI device's mode parameter pages. In particular, mode parameter page code 00h is conventionally designated as a vendor specific page and may provide a suitable location for establishing the broadcast command capability of a device by inclusion of a packet capability code bit. To place a particular SCSI bus system into broadcast command packet mode would then involve a conventional MODE SELECT operation indicating the peripheral device parameter page. Preferably, a device would identify itself as broadcast command capable by transmitting BCP capability information as extensions to the conventional transfer width exponent code used in WIDE DATA TRANSFER negotiations. Specifically, a device that wishes to negotiate for a particular bus width for data transfers conventionally transmits a WIDE DATA TRANSFER REQUEST, comprising 00h for an 8-bit transfer, 01h for a 16-bit transfer, and 02h for a 32-bit wide transfer, during initialization proceedings. In accordance with the invention, the second nibble of the transfer width exponent code preferably comprises the BCP transfer width and, if present, indicates the device is BCP capable. Accordingly, the extensions to the transfer width exponent code would result in exponent code values indicating the following: 00h, no BCP and narrow (8-bit) data, 10h, narrow BCP and narrow data, 01h, no BCP and wide (16-bit) data, 11h, narrow BCP and wide data, 21h, wide BCP and wide data, 02h, no BCP and Dwide (double wide or 32-bit) data, 12h, narrow BCP and Dwide data, 22h, wide BCP and Dwide data, and 32h, Dwide BCP and Dwide data.

It should be understood that the additional extension codes will default to their single bit (first nibble) conventional values in the event that a host is unable to recognize the second (BCP) bit as valid. The host then returns a null value for the second bit, and the system defaults to 00h, 01h, and 02h.

The structure of an exemplary broadcast command packet is shown in FIG. 4, which is a template diagram depicting the byte identification, the byte content description, and byte length of each section of a broadcast command packet. As depicted in FIG. 4, the first byte (byte 0) includes the target ID, a reserved bit and a command or message bit (CM) and a tagged or untagged (UT) bit. The command or message (CM) bit indicates whether the content of the packet payload is a command descriptor block or comprises additional messages. If the CM bit is cleared, the packet payload is a command descriptor block. Alternatively, if the CM bit is set, the contents of the packet payload comprises additional messages. The tagged or untagged (UT) bit indicates that the queue TAG MESSAGE and queue tag value are valid if cleared. If the UT bit is set, this indicates that the I/O process is untagged and the queue TAG message and queue tag value should be ignored. The second byte of the broadcast command packet (byte 1) comprises three reserved bits and the ID of the broadcast command initiator. The third byte (byte 2) comprises an IDENTIFY message (conventionally formatted) while the forth and fifth byte (bytes 3 and 4) comprise a queue TAG message and a queue tag value. The sixth byte (byte 5) is reserved.

The next 16 bytes (byte 6 through byte 21) comprise the packet payload. The packet payload may be flexibly informed and include any one of a variety of commonly defined command descriptor blocks (up to 16 bytes in length) or may comprise 16 bytes of additional messages. In the illustrated broadcast command packet of FIG. 4, the packet payload is shown as comprising a 10 byte command descriptor block followed by 6 bytes of zeros. The final two bytes of the command packet (bytes 22 and 23) comprise a longitudinal redundancy check (LRC) checksum field, used by a target device to validate the packet. Two bytes are provided in order to accommodate a wide bus transfer, with the most significant byte of the checksum field being zero if the negotiated bus width for the broadcast command packet phase is narrow. Accordingly, it will be seen that the 24 byte broadcast command packet is able to support a wide variety of information ranging from a payload comprising command descriptor blocks having up to a maximum command length of 16 bytes to a payload comprising up to 16 bytes of messages.

Figure 5:
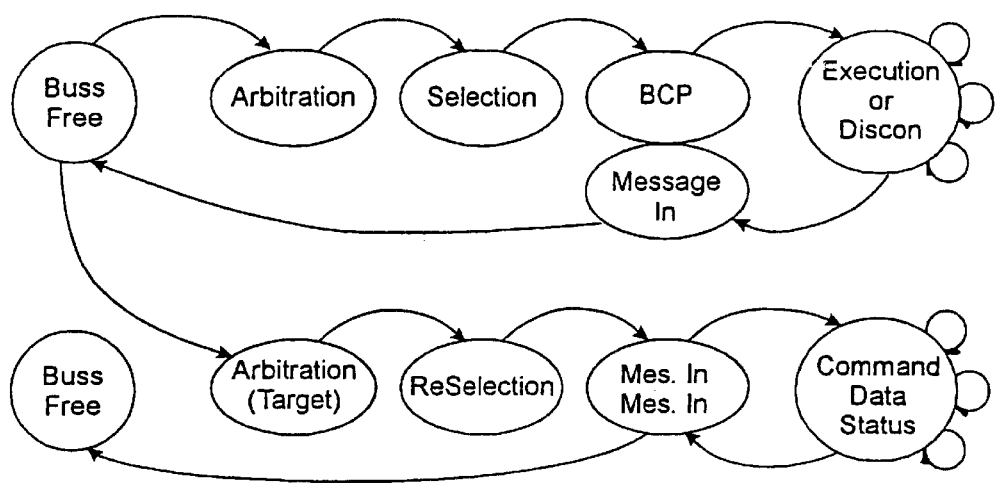
FIG. 5 is a phase diagram of an SCSI protocol including a broadcast command packet phase in accordance with the present invention.

Briefly, the broadcast command packet protocol is initiated following an arbitration phase. As depicted in the exemplary flow diagram of FIG. 5 which illustrates the bus phases comprising an SCSI transaction in accordance with the invention, a transaction, including a broadcast command packet phase, arbitrarily begins at a bus free phase, in a manner similar to a conventional transaction. From bus free, one or more initiators indicate their desire to access the SCSI bus during the arbitration phase by simultaneously asserting BSY along with the data bit that corresponds to its SCSI Id. In conventional fashion, the SCSI initiator with the highest priority ID (i.e., ID-07) wins arbitration and asserts SEL in response. Likewise, according to convention, all of the other competing initiators release BSY and remove their ID bits from the data bus within a bus clear delay time of about 800 ns. The end of the bus clear delay time period concludes the arbitration phase and the arbitration winner initiator now enters the broadcast command packet protocol by asserting a NULL SELECT. A NULL SELECT is defined by the assertion of SEL with a null value applied to the data signal lines. In contrast to a conventional select or reselect phase, a target ID is not asserted on the data signal lines during the NULL SELECT phase. Rather, upon detection of a NULL SELECT, all target devices which are broadcast command packet capable enter a broadcast command packet phase (briefly, a message out phase with REQ not asserted) wherein they are configured to accept a 24-byte (narrow or wide, depending on device capability and the negotiated transfer width exponent code)) packet burst. The packet is subsequently burst from the initiator device using 24 consecutive ACK pulses, each pulse comprising a packet byte. As shown in FIG. 4, each packet comprises the target device ID, 3-bytes of messages, a payload and a checksum.

Still within the broadcast command packet phase, the target device decodes its address, receives the broadcast command packet information, and sends a single REQ pulse back to the initiator, that informs the initiator as to the success of the broadcast command packet transmission. Alternatively, the target device may be configured to send a return byte back to the initiator, using the REQ pulse, that provides the initiator with additional information regarding the packet transmission. Such additional information may comprise the codes for RETRANSMIT, QUEUE FULL, INVALID SUM, and the like, indicating that the packet should be retransmitted.

The target device identified in the first packet may immediately place the bus in the data phase by deasserting C/D and MSG at the end of the broadcast command packet phase and begin transferring data. Following data transfer, the bus protocol cycle concludes normally with status and complete message phases before releasing the bus to a bus free condition.

In accordance with practice of the present invention, multiple command packets may be burst to one or more target devices during the broadcast command packet phase. As depicted in the exemplary flow diagram of FIG. 6, following the NULL SELECT, multiple command packets are sequentially burst to the data bus subsequent to a single arbitration. Each broadcast command packet capable target device connected to the bus evaluates the bus contents and, when it identifies a command packet with its address, receives the packet, queues the command and sends a single REQ pulse back to the initiator. As will be described in greater detail below, potential target devices continue to evaluate the content of the data bus for additional broadcast command packets, so long as the ATN signal remains asserted by the initiator.

Figure 6:
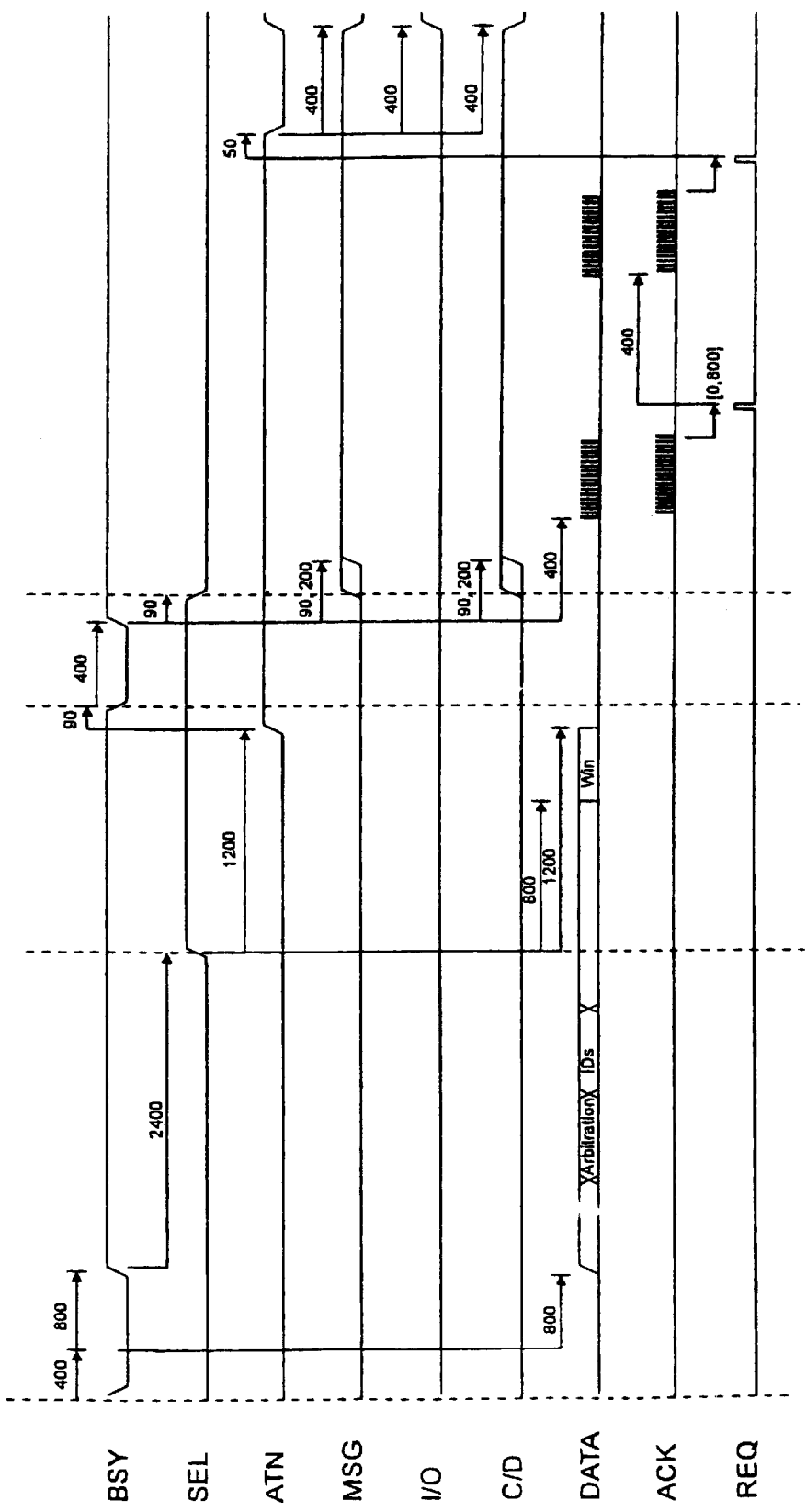
FIG. 6 is a simplified timing diagram of an SCSI protocol including a broadcast command packet phase in accordance with the present invention.

Once ATN is deasserted, indicating that the last packet has been transmitted, the target device identified in the first command packet may, at the end of the broadcast command packet phase, place the bus into the data phase and begin transferring data, or, as indicated in FIG. 6, issue a DISCONNECT message indicating that the target wishes to interrupt the I/O process in order to free the bus for other devices. Such a condition typically obtains when a target device must access data from a physical media, for example a rotating magnetic disk data storage system such as a hard drive. Since hard drive data access times are typically on the order of about 5 to 10 ms, target devices frequently release the bus for other uses while performing data access operations.

Once the target device has retrieved the data from its physical media, the target transfers the data to the initiator in accordance with an arbitration phase, reselection phase, message in phase, and a data transfer phase comprising data in, status and transfer complete messages, in accordance with the conventional SCSI-3 protocol.

It should be noted that target devices identified in the second and subsequent command packets will each arbitrate for control of the SCSI bus as soon as the bus is placed in a bus free condition by the target device identified in the first command packet. Each of the subsequent target devices will follow the conventional arbitration, reselection, message in, data, status, and transfer complete protocol. In other words, at the end of a broadcast command packet phase, the broadcast command packet target identified in the first command packet may transition to a DATA phase or a MESSAGE phase. All other broadcast command packet targets that receive command packets must perform an arbitration and reselection in order to execute their I/O process.

An operational timing diagram for an exemplary broadcast command packet protocol sequence is depicted in FIG. 6, and includes the case where multiple broadcast command packets are burst to the data bus following a NULL SELECT phase. In FIG. 6, a conventional arbitration phase begins with the assertion of BSY by competing initiators and the assertion of the competing arbitration IDs on the data signal lines in conventional fashion. Following the assertion of BSY and the SCSI IDs, each device arbitrating for the bus must wait for at least an arbitration delay of about 2.4 us prior to evaluating the data bus to see if an SCSI ID greater than its own has been asserted. The device with the higher priority ID is determined to be the arbitration winner and, in response, asserts SEL. This indicates to all other competing initiating devices that they should release BSY and remove their SCSI IDs from the data signal lines. A bus clear delay, of approximately 0.8 us is provided in the SCSI protocol in order to allow time for competing initiator devices to clear BSY and remove their SCSI IDs from the bus. Once competing SCSI IDs are removed from the data bus, the arbitration winning initiator maintains its SCSI ID on the bus for approximately 0.4 us prior to initiating the NULL SELECT phase.

When evaluating the total arbitration overhead budget, it will be understood that the arbitration overhead comprises the 2.4 us arbitration delay between the assertion of BSY and SEL, as well as a 0.8 us bus free delay (bus free validated to assert BSY and bus ID bit for arbitration) and a 0.4 us bus settle delay (BSY false to validate bus free), for a total arbitration overhead budget of about 3.6 us. It should be understood that these values represent the best case for arbitration overhead and may increase depending on device performance capabilities, bus loading and the like.

Once the arbitration phase is complete (the winning initiator asserting SEL), the NULL SELECT phase proceeds with a bus clear delay of 0.8 us, as mentioned above, during which time all competing devices remove their IDs from the data bus and clear BSY, along with a bus settle delay of about 0.4 us during which the arbitration winner maintains its ID on the data bus prior to issuing NULL SELECT. Approximately 1.2 us into the selection phase, the initiator issues the NULL SELECT command by asserting ATN and dropping the data bus such that a 0 value appears on all data signals. After approximately 2 deskew delay times (about 0.09 us) the initiator releases BSY, at which time all potential target devices begin looking at the data bus. Upon detecting the NULL SELECTION, all broadcast command packet capable targets enter a broadcast command packet phase and wait the packet transmission. Following an approximately 0.4 us bus settle delay, BSY is asserted by the BCP capable target devices and after an approximately 0.09 us deskew delay, the initiator releases SEL and the BCP capable target devices assert MSG and C/D in order to proceed to the broadcast command packet phase.

In contrast to the conventional SCSI protocol, in which the phase following a successful selection is always a MESSAGE OUT phase, the broadcast command packet phase follows a NULL SELECT phase. The broadcast command packet phase is generally similar to the MESSAGE OUT phase but with the target REQ signal negated. The target device no longer sets REQ, in response to which the initiator writes a message or data byte and sets ACK. Instead, the initiator waits a minimum of approximately 400 us following the detection of BSY, and "bursts" a broadcast command packet on the data bus using consecutive ACK pulses (similar to the manner in which an offset is performed in a modern synchronous transmission) at the maximum data rate (assuming FAST-80 data rates within the SCSI-3 protocol domain, i.e., 160 MB/s for a wide, 16 bit data bus). The transmission speed of a broadcast command packet will, of course, vary depending on the chosen size for the packet (preferably 24 bytes), but regardless of its size, the broadcast command packet target clocks in the packet, in accordance with ACK, decodes the target SCSI Id, and if it is the destination for the packet, the broadcast command packet target sends a single REQ pulse to the initiator, immediately following the terminal ACK pulse of the packet. Although 800 ns is given as atypical maximum delay from the assertion of the last ACK to the assertion of the return REQ, the actual timing window may be as small as 0.0 ns.

As is depicted in FIG. 6, the initiator is maintaining the ATN signal in the asserted state throughout the first broadcast command packet transfer and during receipt of the REQ acknowledgment from the target. Approximately 0.4 us following receipt of an acknowledgment REQ pulse indicating successful transmission, the initiator may burst an additional broadcast command packet, or multiple additional packets, onto the data bus with consecutive ACK pulses in the same manner as described above. This additional, optional, broadcast command packet, or packets, may be directed to a different target device, or to the previous target device but to a different LUN, or a different I/O process. The second, and subsequent, designated recipient(s) also issues a single REQ pulse and the process continues until all desired broadcast command packets have been written to the bus and their receipt has been indicated by the designated target.

Following the last REQ, the initiator deasserts ATN indicating the last packet has been transmitted. It should be noted, however, that the initiator may also drop ATN if it has not received a REQ signal in response to a packet transmission within an established "last ACK to REQ" time-out period, preferably from about 800 to about 1000 ns. Thus, deassertion of ATN provides targets with a means to determine the end of a BCP phase, whether the phase terminates normally or as the result of a fault condition.

At the completion of the broadcast command packet phase (ATN deasserted), the protocol of the present invention returns to a generally conventional state, in which the initiator and the first designated target may perform an OUT/IN phase change (taking approximately 0.8 us) prior to the bus entering a MESSAGE IN phase during which time the first designated target may send DISCONNECT to the initiator (conventionally about 0.5 us). Subsequent bus activity follows the conventional SCSI-3 protocol, in which the first designated target must arbitrate for the bus, and reselect, prior to data transfer. It should be noted, however, that the first designated target need not put the bus in a bus free condition after receipt of its broadcast command packet. Indeed, after the last packet has been transmitted, and the initiator deasserts ATN to so indicate, the first designated target device may immediately begin a data phase by deasserting C/D and MSG and transfer data either synchronously or asynchronously, depending on the I/O process identified in the packet. As discussed previously, all other broadcast command packet targets that received command packets must perform an arbitration and reselection in order to complete their commands.

The particular utility of the present invention may be best understood by evaluating the degree of improvement provided to conventional parallel SCSI protocol efficiencies. As data transfer speeds increase to FAST-80, the protocol overhead becomes a significant factor in the throughput performance of parallel SCSI. Protocol enhancements, in accordance with present invention, significantly improve parallel SCSI performance by reducing overhead. The metric which will be used to measure this improvement is bus efficiency (or average throughput).

The following analysis describes a comparison of the broadcast command packet protocol to the conventional FAST-80 protocol having a data transfer rate of 80M Transfers per second. Both wide and narrow cases will be evaluated in the context of a 4K data read in both 2K and 4K data chunks.

In order to normalize the comparison, it will be assumed that the system comprises a 12 meter cable having a 5 ns per meter signal cruising speed, for a cable propagation delay of approximately 60 ns. SCSI devices are assumed to be synchronous with respect to detecting phase changes and operate at 80 Mhz, thus taking two clock periods, or 25 ns, for detection.

The following table, Table 1, lists the SCSI-3 timing values which will be used for all subsequent calculations. Although these values may be conventionally determined by one having skill in the art, derivations for the values are contained in Tables 2, 3, 4, 5 and 6 which follow.

TABLE 1

SCSI-3 Timing

| | |
|---|---|
| Arbitration Overhead: | 3.6 us |
| Selection Overhead | 2.0 us |
| Sending 1 asynchronous byte: | .05 us (rounded up from 0.465) |
| Sending a 10 byte Command | 5.0 us |
| Transmit 2K bytes at 80 M/s: | 25.6 us |
| Transmit 2K bytes at 160 MB/s: | 12.8 us |
| Transmit 4K bytes at 80 M/s: | 51.2 us |
| Transmit 4K bytes at 160 MB/s: | 25.6 us |

TABLE 2

Arbitration Overhead

| | |
|---|---|
| T-Bus Settle Delay | 400 ns |
| T-Bus Free Delay | 800 ns |
| T-Arbitration Delay | 2400 ns |
| Total Overhead | 3.6 ns |

TABLE 3

Selection Overhead

| | |
|---|---|
| T-Bus Clear Delay | 800 ns |
| T-Bus Settle Delay | 400 ns |
| 2xT-Deskew Delay | 90 ns |
| T-Bus Settle Delay | 400 ns |
| 2xT-Deskew Delay | 90 ns |
| Total Overhead | 1.78 ns | rounded up to 2.0 ns for ease of calculation

TABLE 4

Sending 1 Asynchronous Byte

| | Initiator | Prop | Target | Comment |
|---|---|---|---|---|
| REQ Assertion | | | 25 ns | |
| REQ Propagation | | 60 ns | | |
| REQ Detection | 25 ns | | | |
| Data Assertion | 25 ns | | | |
| ACK Assertion | 50 ns | | | |
| ACK Propagation | | 60 ns | | |
| ACK Detection | | | 25 ns | |

TABLE 4-continued

Sending 1 Asynchronous Byte

| | Initiator | Prop | Target | Comment |
|---|---|---|---|---|
| REQ negation | | | 25 ns | |
| REQ Propagation | | 60 ns | | |
| ACK negation | 25 ns | | | |
| ACK Propagation | | 60 ns | | |
| ACK Detection | | | 25 ns | |
| Total | 125 ns | 240 ns | 100 ns | Grand Total ≈ 465 us |

TABLE 5

Sending a 10 Byte Command

| | Initiator | Prop | Target | Comment |
|---|---|---|---|---|
| Phase Change: | | | 0ns | |
| CMD REQ Assertion Delay | | | 400 ns | |
| 10 Async Bytes | 10 * 125 ns | 10 * 240 ns | 10 * 100 ns | |
| Total | 1250 ns | 2400 ns | 1400 ns | Grand Total ≈ 5.05 us |

TABLE 6

Data Transmission Timing

| | | |
|---|---|---|
| Transmit 2K at 80 MB/s | 2048/80 MB/s | 25.6 ns |
| Transmit 2K at 160 MB/s | 2048/80 MB/s | 12.8 ns |
| Transmit 4K at 80 MB/s | 4096/160 MB/s | 51.2 ns |
| Transmit 4K at 160 MB/s | 4096/160 MB/s | 25.6 ns |

EFFICIENCY ANALYSIS

The following analysis is a comparison between 4K data read operations according to the existing SCSI FAST-80 protocol and the broadcast command packet protocol, in accordance with the invention, implementing a single broadcast command packet and multiple broadcast command packets. The analysis evaluates SCSI bus efficiency when the 4K read operation is performed over a narrow and a wide bus, and with 2K and 4K data chunks.

The following tables 7 and 8 evaluate SCSI bus efficiency as it would exist operating at FAST-80 data rates within the conventional SCSI-3 protocol domain. In Table 7, efficiency for both narrow (80 MB/s) and wide (160 MB/s) data rates are calculated when a 10 byte CDB is used for issuing a 4K SCSI read to an SCSI disk. The data is returned using two reconnections, each with a 2K transfer.

TABLE 7

Ultra-3/SCSI Timing/4K Read/2K Data Chunks

| Narrow SCSI 80 MB/s | | Wide SCSI 160 MB/s | |
|---|---|---|---|
| Arbitration | 3.6 | Arbitration | 3.6 |
| Selection | 2 | Selection | 2 |
| Identify/Simple Tag MO | 1.5 | Identify/Simple Tag MO | 1.5 |
| OutOut Phase Change | 0.4 | OutOut Phase Change | 0.4 |
| Command | 5 | Command | 5 |
| OutIn Phase Change | 0.8 | OutIn Phase Change | 0.8 |
| SavePtrs/Disconnect | 1 | SavePtrs/Disconnect | 1 |
| Arbitration | 3.6 | Arbitration | 3.6 |

TABLE 7-continued

Ultra-3/SCSI Timing/4K Read/2K Data Chunks

| Narrow SCSI 80 MB/s | | Wide SCSI 160 MB/s | |
|---|---|---|---|
| ReSelection | 2 | ReSelection | 2 |
| Identify/Simple Tag MI | 1.5 | Identify/Simple Tag MI | 1.5 |
| InIn Phase Change | 0.4 | InIn Phase Change | 0.4 |
| Transfer Narrow 2K | 25.6 | Transfer Wide 2K | 12.8 |
| InIn Phase Change | 0.4 | InIn Phase Change | 0.4 |
| SavePtrs/Disconnect | 1 | SavePtrs/Disconnect | 1 |
| Arbitration | 3.6 | Arbitration | 3.6 |
| ReSelection | 2 | ReSelection | 2 |
| Identify/Simple Tag MI | 1.5 | Identify/Simple Tag MI | 1.5 |
| InIn Phase Change | 0.4 | InIn Phase Change | 0.4 |
| Transfer Narrow 2K | 25.6 | Transfer Wide 2K | 12.8 |
| InIn Phase Change | 0.4 | InIn Phase Change | 0.4 |
| Status | 0.5 | Status | 0.5 |
| InIn Phase Change | 0.4 | InIn Phase Change | 0.04 |
| Complete MI | 0.5 | Complete MI | 0.5 |
| Overhead (us) | 32.5 | Overhead (us) | 32.5 |
| Data Transfer (us) | 51.2 | Data Transfer (us) | 25.6 |
| Total Bus Time (us) | 83.7 | Total Bus Time (us) | 58.1 |
| Efficiency (%) | 61.2 | Efficiency (%) | 44.1 |
| Average TP (MB/s) | 49 | Average TP (MB/s) | 70.6 |

Table 8 describes SCSI bus efficiency when a 10 byte CDB is used for issuing a 4K SCSI read to an SCSI disk. The data is returned in a single reconnection, with a 4K transfer.

TABLE 8

Ultra-3/SCSI-3 Timing/4K Read/2K Data Chunks

| Narrow SCSI 80 MB/s | | Wide SCSI 160 MB/s | |
|---|---|---|---|
| Arbitration | 3.6 | Arbitration | 3.6 |
| Selection | 2 | Selection | 2 |
| Identify/Simple Tag MO | 1.5 | Identify/Simple Tag MO | 1.5 |
| OutOut Phase Change | 0.4 | OutOut Phase Change | 0.4 |
| Command | 5 | Command | 5 |
| OutIn Phase Change | 0.8 | OutIn Phase Change | 0.8 |
| SavePtrs/Disconnect | 1 | SavePtrs/Disconnect | 1 |
| Arbitration | 3.6 | Arbitration | 3.6 |
| ReSelection | 2 | ReSelection | 2 |
| Identify/Simple Tag MI | 1.5 | Identify Simple Tag MI | 1.5 |
| InIn Phase Change | 0.4 | InIn Phase Change | 0.4 |
| Transfer Narrow 4K | 51.2 | Transfer Wide 4K | 25.6 |
| InIn Phase Change | 0.4 | InIn Phase Change | 0.4 |
| Status | 0.5 | Status | 0.5 |
| InIn Phase Change | 0.4 | InIn Phase Change | 0.4 |
| Complete MI | 0.5 | Complete MI | 0.5 |
| Overhead (us) | 22.8 | Overhead (us) | 22.8 |
| Data Transfer (us) | 51.2 | Data Transfer (us) | 25.6 |
| Total Bus Time (us) | 74 | Total Bus Time (us) | 48.4 |
| Efficiency (%) | 69.2 | Efficiency (%) | 52.9 |
| Average TP (MB/s) | 55.4 | Average TP (MB/s) | 84.6 |

As can be seen from evaluating tables 7 and 8, operational overhead remains the same for both narrow and wide data rates. As would be expected, returning data in a single reconnection with a 4K transfer, exhibits a higher average throughput (better efficiency) than returning data using two reconnections. However, in the case of a wide (160 MB/S) transfer, bus efficiency is less than 50% when two reconnections are required, and only slightly exceeds 50% when data is returned in a single reconnection, with a 4K transfer.

The following Tables 9 and 10 evaluate SCSI bus efficiency as it would exist operating at FAST-80 data rates within the broadcast command packet protocol domain in accordance with the present invention. Table 9 describes bus efficiency when a single broadcast command packet is used for issuing a 4K SCSI read to an SCSI disk, with the data being returned using two reconnections, each with a 2K transfer.

TABLE 9

Ultra-3/Single BCP/4K Read/2K Data Chunks

| Narrow SCSI 80 MB/s | | Wide SCSI 160 MB/s | |
|---|---|---|---|
| Arbitration | 3.6 | Arbitration | 3.6 |
| NULL Selection | 2 | NULL Selection | 2 |
| BCP | 1 | BCP | 1 |
| OutIn Phase Change | 0.8 | OutIn Phase Change | 0.8 |
| SavePtrs/Disconnect | 1 | SavePtrs/Disconnect | 1 |
| Arbitration | 3.6 | Arbitration | 3.6 |
| ReSelection | 2 | ReSelection | 2 |
| Identify/Simple Tag MI | 1.5 | Identify/Simple Tag MI | 1.5 |
| InIn Phase Change | 0.4 | InIn Phase Change | 0.4 |
| Transfer Narrow 2K | 25.6 | Transfer Wide 2K | 12.8 |
| InIn Phase Change | 0.4 | OutIn Phase Change | 0.4 |
| SavePtrs/Disconnect | 1 | SavePtrs/Disconnect | 1 |
| Arbitration | 3.6 | Arbitration | 3.6 |
| ReSelection | 2 | ReSelection | 2 |
| Identify/Simple Tag MI | 1.5 | Identify/Simple Tag MI | 1.5 |
| InIn Phase Change | 0.4 | InIn Phase Change | 0.4 |
| Transfer Narrow 2K | 25.6 | Transfer Wide 2K | 12.8 |
| InIn Phase Change | 0.4 | InIn Phase Change | 0.4 |
| Status | 0.5 | Status | 0.5 |
| InIn Phase Change | 0.4 | InIn Phase Change | 0.4 |
| Complete MI | 0.5 | Complete MI | 0.5 |
| Overhead (us) | 26.6 | Overhead (us) | 26.6 |
| Data Transfer (us) | 51.2 | Data Transfer (us) | 25.6 |
| Total Bus Time (us) | 77.8 | Total Bus Time (us) | 52.2 |
| Efficiency (%) | 65.8 | Efficiency (%) | 49 |
| Average TP (MB/s) | 52.6 | Average TP (MB/s) | 78.4 |

Table 10 describes SCSI bus efficiency when a single broadcast command packet is used for issuing a 4K read, with the data being returned in a single reconnection, with the 4K transfer.

TABLE 10

Ultra-3/Single BCP/4K Read/4K Data Chunks

| Narrow SCSI 80 MB/s | | Wide SCSI 160 MB/s | |
|---|---|---|---|
| Arbitration | 3.6 | Arbitration | 3.6 |
| NULL Selection | 2 | NULL Selection | 2 |
| BCP | 1 | BCP | 1 |
| OutIn Phase Change | 0.8 | OutIn Phase Change | 0.8 |
| SavePtrs/Disconnect | 1 | SavePtrs/Disconnect | 1 |
| Arbitration | 3.6 | Arbitration | 3.6 |
| ReSelection | 2 | ReSelection | 2 |
| Identify/Simple Tag MI | 1.5 | Identify Simple Tag MI | 1.5 |
| InIn Phase Change | 0.4 | InIn Phase Change | 0.4 |
| Transfer Narrow 4K | 51.2 | Transfer Wide 4K | 25.6 |
| InIn Phase Change | 0.4 | InIn Phase Change | 0.4 |
| Status | 0.5 | Status | 0.5 |
| InIn Phase Change | 0.4 | InIn Phase Change | 0.4 |
| Complete MI | 0.5 | Complete MI | 0.5 |
| Overhead (us) | 17.7 | Overhead (us) | 17.7 |
| Data Transfer (us) | 51.2 | Data Transfer (us) | 25.6 |
| Total Bus Time (us) | 68.9 | Total Bus Time (us) | 43.3 |
| Efficiency (%) | 74.3 | Efficiency (%) | 59.1 |
| Average TP (MB/s) | 59.4 | Average TP (MB/s) | 94.6 |

As can be seen by comparing the efficiency and average throughput values for the broadcast command packet transfer of Table 9 with the existing protocol transfer of Table 7 and the single broadcast command packet transfer of Table 10 with the existing protocol transfer of Table 8, the broadcast command packet protocol, in accordance with the invention, provides a significant improvement in efficiency and average through put by significantly reducing the amount of overhead required for a transfer. In particular, the overhead associated with a narrow (80 MB/s) transfer, using two reconnections, each with a 2K transfer, drops from 32.5

μs to about 26.6 μs, a reduction of approximately 18%. Since the overhead value is the same for a wide (160 MB/s) transfer, the same approximately 18% reduction is obtained in the wide case as well.

An even greater overhead reduction (on a percentage basis) is seen in the case of a 4K read with the data being returned in a single reconnection, with a 4K transfer. Comparing the overhead values of the broadcast command packet transfer of Table 10 with the overhead values of the conventional protocol transfer of Table 8, shows a reduction of from 22.8 μs to about 17.7 μs (a reduction of approximately 22%).

It will also be evident that the average efficiency and throughput values increase as a result.

An analysis of the overhead reduction and consequent increase in efficiency in average throughput is next performed in the context of typical operational data transfers, making use of the ability of the protocol of the present invention to burst multiple broadcast command packets in a single phase. Tables 11 and 12 evaluate the bus efficiencies and average throughput values in an exemplary case where 16 commands are burst to a mix of target devices using the broadcast command packet protocol for a 4K SCSI read to an SCSI disk. Tables 11 and 12 evaluate bus efficiencies for a 4K SCSI read with 2K and 4K data chunk transfers respectively.

TABLE 11

Ultra-3/16 BCPs/4K Read/2K Data Chunks

| Narrow SCSI 80 MB/s | | | Wide SCSI 160 MB/s | |
|---|---|---|---|---|
| Arbitration | 3.6 | | Arbitration | 3.6 |
| NULL Selection | 2 | | NULL Selection | 2 |
| BCPs | 19 | | BCPs | 19 |
| OutIn Phase Change | 0.8 | | OutIn Phase Change | 0.8 |
| SavePtrs/Disconnect | 1.8 | | SavePtrs/Disconnect | 1.8 |
| Arbitration | 3.6 | x32 | Arbitration | 3.6 |
| ReSelection | 2 | x32 | ReSelection | 2 |
| Identify/Simple Tag MI | 1.5 | x32 | Identify/Simple Tag MI | 1.5 |
| InIn Phase Change | 0.4 | x32 | InIn Phase Change | 0.4 |
| Transfer Narrow 2K | 25.6 | x32 | Transfer Wide 2K | 12.8 |
| InIn Phase Change | 0.4 | x32 | InIn Phase Change | 0.4 |
| SavePtrs/Disconnect | 1.8 | x31 | SavePtrs/Disconnect | 1.8 |
| Status | 0.5 | x16 | Status | 0.5 |
| InIn Phase Change | 0.4 | x16 | InIn Phase Change | 0.4 |
| Complete MI | 0.5 | x16 | Complete MI | 0.5 |
| Overhead (us) | 357.4 | | Overhead (us) | 357.4 |
| Data Transfer (us) | 819.2 | | Data Transfer (us) | 409.6 |
| Total Bus Time (us) | 1176.6 | | Total Bus Time (us) | 767 |
| Efficiency (%) | 69.6 | | Efficiency (%) | 53.4 |
| Average TP (MB/s) | 55.7 | | Average TP (MB/s) | 85.4 |

TABLE 12

Ultra-3/16 BCPs/4K Read/4K Data Chunks

| Narrow SCSI 80 MB/s | | | Wide SCSI 160 MB/s | |
|---|---|---|---|---|
| Arbitration | 3.6 | | Arbitration | 3.6 |
| NULL Selection | 2 | | NULL Selection | 2 |
| BCPs | 19 | | BCPs | 19 |
| OutIn Phase Change | 0.8 | | OutIn Phase Change | 0.8 |
| SavePtrs/Disconnect | 1 | | SavePtrs/Disconnect | 1 |
| Arbitration | 3.6 | x16 | Arbitration | 3.6 |
| ReSelection | 2 | x16 | ReSelection | 2 |
| Identify/Simple Tag MI | 1.5 | x16 | Identify Simple Tag MI | 1.5 |
| InIn Phase Change | 0.4 | x16 | InIn Phase Change | 0.4 |
| Transfer Narrow 4K | 51.2 | x16 | Transfer Wide 4K | 25.6 |
| InIn Phase Change | 0.4 | x16 | InIn Phase Change | 0.4 |
| SavePtrs/Disconnect | 1 | x16 | SavePtrs/Disconnect | 1 |
| InIn Phase Change | 0.4 | x16 | InIn Phase Change | 0.4 |
| Status | 0.5 | x16 | Status | 0.5 |
| InIn Phase Change | 0.4 | x16 | InIn Phase Change | 0.4 |
| Complete MI | 0.5 | x16 | Complete MI | 0.5 |
| Overhead (us) | 196.6 | | Overhead (us) | 196.6 |
| Data Transfer (us) | 819.2 | | Data Transfer (us) | 409.6 |
| Total Bus Time (us) | 1015.8 | | Total Bus Time (us) | 606.2 |
| Efficiency (%) | 80.6 | | Efficiency (%) | 67.6 |
| Average TP (MB/s) | 64.5 | | Average TP (MB/s) | 108.2 |

As can be seen from Tables 11 and 12, bursting multiple broadcast command packets to a mix of target devices significantly reduces overhead, thereby increasing efficiency. In particular, it should be noted that bus efficiency is now greater than 50% for both cases of a wide (160 MB/s) transfer and, indeed, the average throughput for a wide transfer of 4K data chunks now exceeds 100 MB/s (reaches 108.2 MB/s).

Indeed, as the number of command packets burst per initiator arbitration win increases, bus efficiency approaches a limit imposed by the reconnect, transfer and disconnect sequence. By summing the timing values between arbitration and SAVE POINTERS/DISCONNECT in the reconnect sequences of Tables 11 and 12, it can be determined by one having skill in the art that the theoretical maximum efficiency of a 2K narrow data transfer is approximately 73.4%, the theoretical maximum efficiency of a 2K wide data transfer is approximately 57.9%, the theoretical maximum efficiency of a 4K narrow data transfer is approximately 85.2%, while the theoretical maximum efficiency of a 4K wide data transfer is approximately 74.2%. Accordingly, it will be understood by one having skill in the art that multiple broadcast command packets, when burst to a mix of targets, more closely approach the theoretical maximum bus efficiency than the existing SCSI-3 protocol operating at FAST-80 data rates.

Additional enhancements to bus efficiency may be made by allowing target devices to negotiate for either a narrow or a wide bus when using the broadcast command packet protocol. As described in detail above, extensions to the transfer width exponent code used in WIDE DATA TRANSFER negotiation are particularly suitable for this purpose. It is, of course, clear that using 16-bit broadcast command packets on a 16-bit bus will result in a reduced packet transfer time from that represented in the tables above.

It will be apparent to those skilled in the art that the present invention brings to the field of SCSI protocols a novel technique for reducing the timing overhead associated with multiple data transfer operations, thereby significantly increasing bus efficiencies and average throughput. The technique involves collapsing message in and command phases into a broadcast command packet phase, where broadcast command packets may be sequentially burst onto the SCSI bus to a mix of target devices, subsequent to a single arbitration phase. Specific features of the present invention, such as the structure of a broadcast command packet, or the specific assertion timings of specific signals, may be embodied in a wide variety of ways without violating the spirit and scope of the present invention. For instance, the broadcast command packet may be any number of bytes in length, and may be configured to be broadcast over a 16 or 32 bit bus. In addition, the meaning and configuration of each byte comprising the broadcast command packet may be rearranged in any fashion, so long as the structure of the broadcast command packet is made known to a broadcast command packet capable target device.

In addition, specific timing delays described in the illustrated embodiments are taken from the SCSI-2 specification and the SCSI-3 proposed protocol documentation. As will be well understood by those having skill in the art, specific timing values have been defined in order to accommodate older devices having tri-state outputs and include timing windows suitable for simple tri-state release. The protocol of the present invention may be modified to comprise suitably reduced timing windows, if the protocol is implemented by devices operating in accordance with active assertion and deassertion. It will also be apparent to those skilled in the art, that future SCSI protocols will necessarily have different timing and delay parameters and that these future timing and delay parameters are equally applicable to the technique of the present invention.

What is claimed is:

1. In an SCSI protocol, in which an initiator device arbitrates for control of an SCSI bus in order to provide message and command data to a target device, a method for reducing protocol overhead with respect to message and command transmissions, comprising the steps of:

providing a NULL SELECT command including an ATN signal in combination with null values on all data signals on a data bus;

broadcasting a command packet, the command packet including an information payload, the command packet further including an IDENTIFY MESSAGE and TAG MESSAGE, such that the command packet collapses an IDENTIFY and SIMPLE TAG message into a command descriptor block so as to define a packet; and wherein each respective one of a multiplicity of target devices residing on an SCSI bus, simultaneously receive said command packet, each respective one of the multiplicity of target devices reading a target ID field in order to determine whether it is the intended recipient of said command packet.

2. The method according to claim 1, wherein the command packet is broadcast by an arbitration winning initiator device, the initiator and target devices coupled to an SCSI bus.

3. The method according to claim 2, wherein each target device capable of receiving broadcast command packets is identified as such by entering a broadcast command packet configuration identifier into each target device's mode parameter page.

4. The method according to claim 3, the method including the step of configuring the SCSI bus to operate in broadcast command packet mode, the configuring step further comprising:

initiating a MODE SELECT operation, the initiator indicating the mode parameter page containing the broadcast command packet configuration identifier; and identifying broadcast command packet capable devices by having capable devices transmit the broadcast command packet configuration identifier as an extension to a transfer width exponent code.

5. The method according to claim 4, wherein the broadcast command packet configuration identifier comprises a second nibble of the transfer width exponent code.

6. The method according to claim 4, further comprising broadcasting a multiplicity of command packets in sequential, back-to-back fashion, each broadcast command packet capable target device evaluating the bus contents and reading a target ID field of each broadcast command packet in order to determine if it is the intended recipient of said broadcast command packet.

7. The method according to claim 6, wherein a target device identifies a broadcast command packet as containing its address in the target ID field, the method further comprising:

receiving said broadcast command packet;

queuing said packet payload; and issuing an REQ pulse to the initiator, thereby indicating receipt of said broadcast command packet.

8. The method according to claim 7, wherein the target device identified in a first broadcast command packet of a sequential broadcast places the SCSI bus into a data phase immediately at the completion of a broadcast command packet phase, the target device thereafter transferring data over the bus.

9. In an SCSI protocol, in which IDENTIFY and SIMPLE TAG messages are collapsed along with a command descriptor block into a broadcast command packet, the broadcast command packet being subsequently broadcast to a multiplicity of target devices residing on an SCSI bus in a burst subsequent to an arbitration, the broadcast command packet comprising:

a target ID byte and an initiator ID byte;

an IDENTIFY message byte;

a queue TAG message byte and a queue TAG value byte;

a packet payload; and an indicator bit for defining whether the content of the packet payload comprises a command descriptor block or comprises messages.

10. The broadcast command packet according to claim 9, the broadcast command packet comprising a 24-byte template, the packet payload comprising a 16-byte portion containing either an up to 16-byte command descriptor block or an up to 16-byte message block.

11. In an SCSI protocol, in which IDENTIFY and SIMPLE TAG messages are collapsed along with a command descriptor block into a broadcast command packet, the broadcast command packet being subsequently broadcast to a multiplicity of target devices residing on an SCSI bus in a burst subsequent to an arbitration, a system for reducing protocol overhead with respect to message and command transmission, comprising:

a broadcast command packet including;

a target ID byte and an initiator byte;

an IDENTIFY message byte;

a queue TAG message byte and a queue TAG value byte;

a packet payload; and an INDICATOR bit for defining whether the content of the packet payload comprises a command descriptor block or comprises messages; and wherein each respective one of a multiplicity of target devices residing on the SCSI bus simultaneously receive said command packet, each respective one of the multiplicity of target devices reading the target ID byte in order to determine whether it is the intended recipient of said command packet.

12. The system according to claim 11, wherein each target device capable of receiving broadcast command packets is identified as such by entering a broadcast command packet configuration identifier for each target device into a mode parameter page.

13. The system according to claim 12, wherein the SCSI bus is configured to operate in broadcast command packet mode by initiating a MODE SELECT operation, the initiator indicating the mode parameter page containing the broadcast command packet configuration identifier, each broadcast command packet capable target device identifying itself as such by transmitting the broadcast command packet configuration identifier as an extension to a transfer width exponent code in response to said MODE SELECT.

14. The system according to claim 13, wherein the broadcast command packet configuration identifier comprises a second nibble of the transfer width exponent code.

15. The system according to claim 14, wherein a target device identifies a broadcast command packet as containing its address in the target ID field, the target device receiving said broadcast command packet, queuing said packet payload, and issuing an REQ pulse to the initiator indicating receipt of said broadcast command packet.

* * * * *